United States Patent [19]

Law et al.

[11] Patent Number: 5,151,244

[45] Date of Patent: Sep. 29, 1992

[54] APPARATUS FOR FILTERING AND ADJUSTING THE PH OF NUCLEAR REACTOR COOLANT WATER FOR THE TESTING OF SOLUBLE CONTENTS THEREFOR

[75] Inventors: Robert J. Law; Michel N. Robles, both of Livermore; Dane T. Snyder, San Jose, all of Calif.

[73] Assignee: General Electric Company, San Jose, Calif.

[21] Appl. No.: 757,773

[22] Filed: Sep. 11, 1991

[51] Int. Cl.$^5$ .............................................. G21C 17/02
[52] U.S. Cl. ..................................... 376/245; 376/253; 376/313; 73/863.23; 73/863.61; 73/864.81; 422/68.1; 422/71
[58] Field of Search ............... 376/245, 253, 312, 313; 73/864.81, 863.23, 863.61; 422/68.1, 71

[56] References Cited

U.S. PATENT DOCUMENTS

| | | | |
|---|---|---|---|
| 4,472,354 | 9/1984 | Passell et al. | 422/62 |
| 4,764,338 | 8/1988 | Uchida et al. | 376/313 |
| 4,806,278 | 2/1989 | Vodicska et al. | 252/631 |
| 4,978,506 | 12/1990 | Calderwood | 422/73 |

*Primary Examiner*—Brooks H. Hunt
*Assistant Examiner*—Chrisman D. Carroll
*Attorney, Agent, or Firm*—Robert R. Schroeder

[57] ABSTRACT

Water testing apparatus for monitoring circulating water coolant in service within a water cooled nuclear reactor system is disclosed. The invention is an improvement in such water testing apparatus and comprises filtering and a preconditioning of selected sample specimens of the coolant water with a pH adjustment for inhibiting unbalancing an equilibrium in solution of water coolant with ion solutes.

15 Claims, 3 Drawing Sheets

APPARATUS FOR FILTERING AND ADJUSTING THE PH OF NUCLEAR REACTOR COOLANT WATER FOR THE TESTING OF SOLUBLE CONTENTS THEREFOR

FIELD OF THE INVENTION

This invention relates to the analytical testing of the coolant water circulating throughout a water cooled and moderated nuclear fission reactor plant. The invention comprises an apparatus utilized in connection with analytical testing of water specimens sampled for testing.

BACKGROUND OF THE INVENTION

Typical boiling water and pressurized water nuclear fission reactor plants comprise a nuclear fission reactor having an enclosed body of heat producing fissionable fuel which is associated with steam driven turbines for propelling electrical generators. Reactor coolant water is continuously circulated through the system during normal operation to carry the produced heat energy away from the fuel core for the formation of steam to be expended in work driving a turbine. The thus utilized coolant water and/or steam condensate is in turn cycled back into the nuclear reactor to repeat its heat energy transferring circuit substantially endlessly. This repeated circulation of coolant water throughout a vast network of vessels and conduits composed of different materials, chemical and physical conditions including temperatures, pressures and radiation, and products of radiation commonly containing corrosive agents, requires constant monitoring of the chemistry of the circulating coolant water from different locations throughout the system.

Common analytical testing procedures for nuclear fission reactor coolant water comprises sequentially sampling individual water specimens from many diverse locations throughout the nuclear reactor coolant water circulating system. The sampled coolant water specimens are each transferred through a network of coolant water sample conveying conduits or tubes to a central or consolidated water analyzing instrument. The water testing instrument analyses each specimen in sequence for determining the presence of designated constituents such as chloride, sodium, potassium, sulphate, etc. and their concentrations dissolved within the coolant water samples. This soluble constituent data derived from various coolant water samples provides a basis for modifying the water chemistry as a means of controlling the content of components causing corrosion or radiation and the like potentially deleterious conditions within the coolant water circulating system.

Typical of nuclear reactor coolant water testing or monitoring apparatus and water analysis procedures is the disclosure of U.S. Pat. No. 4,472,354, issued Sep. 18, 1984. The disclosure and contents of the aforesaid U.S. Pat. No. 4,472,354 is incorporated herein by reference.

SUMMARY OF THE INVENTION

This invention constitutes an apparatus used in connection with an analytical testing procedure wherein samples of nuclear reactor coolant water are sequentially collected at different locations throughout the coolant circulation system and each sample specimen conveyed to an analytical instrument for evaluation. The apparatus of the invention includes means for performing a preanalysis filtration and adjustment in the pH value of the sampled coolant water specimens to stabilize ion concentrations.

OBJECTS OF THE INVENTION

It is a primary object of this invention to provide an improved means for testing the soluble contents of nuclear reactor coolant water.

It is an additional object of this invention to provide an analytical testing apparatus and means which more effectively and accurately evaluates soluble ions within the coolant water of a nuclear fission reactor cooling system.

It is another object of this invention to provide an apparatus for preparing sample specimens for testing for the soluble contents of coolant water from different locations throughout the coolant circuit.

It is still another object of this invention to provide an apparatus for analyzing nuclear reactor coolant water for its soluble content which filter and inhibits unbalancing of an equilibrium in solution of the coolant with any metal ion solutes derived from contact with metal vessels and conduits.

It is also an object of this invention to provide an apparatus for testing for the soluble ion contents of nuclear reactor coolant water comprising means for filtering and preconditioning test samples to a pH level for stabilizing ion equilibriums.

DETAILED DESCRIPTION OF THE INVENTION

Figure 1:
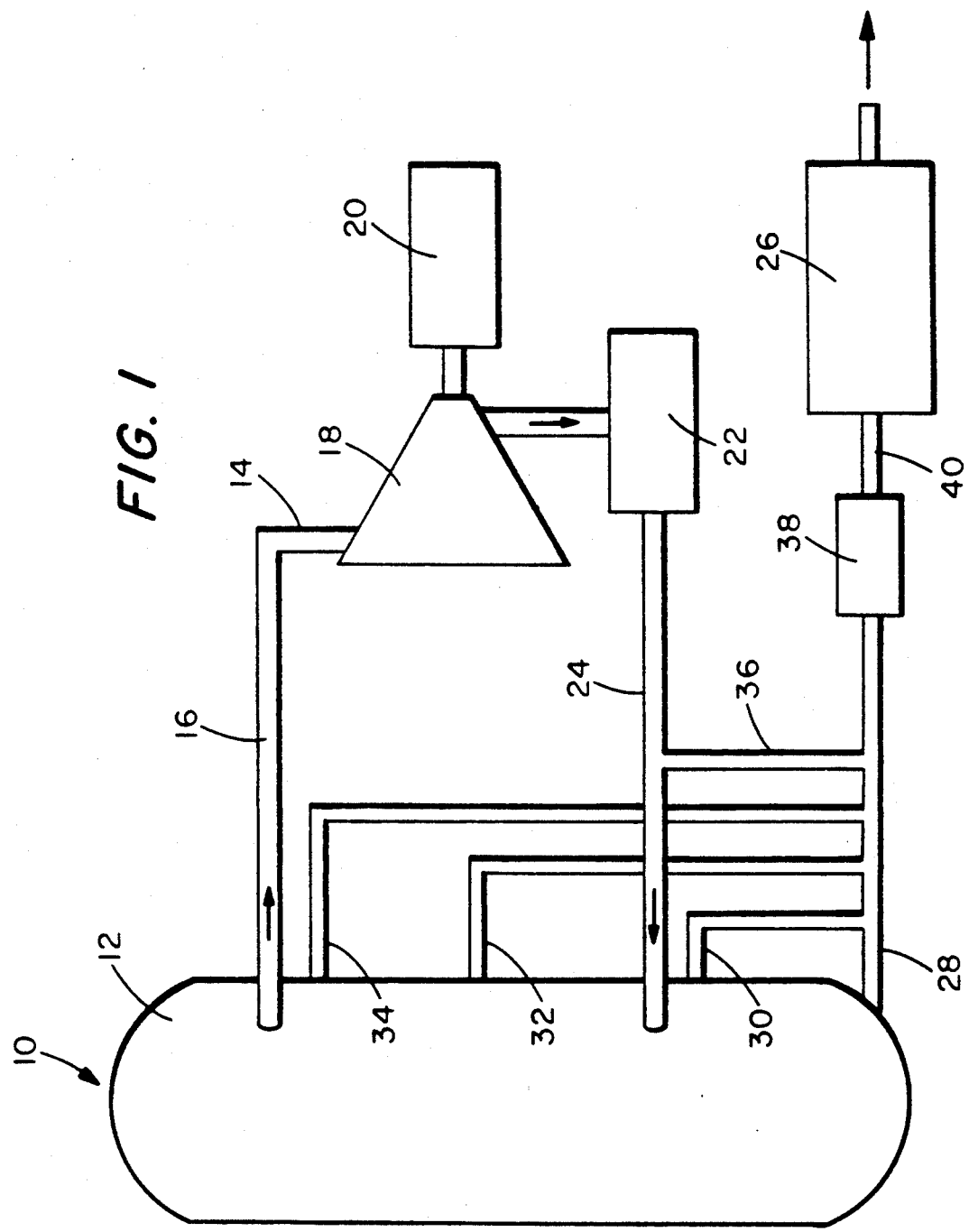
FIG. 1 of the drawings comprises a flow diagram of a nuclear fission reactor illustrating a system for taking samples of coolant water from throughout the coolant circuit and testing the water samples in an analytical instrument.

Referring to the drawings, FIG. 1 in particular, a water cooled and moderated nuclear fission reactor plant 10 comprises a reactor pressure vessel 12 housing a core of heat producing fissionable fuel (not shown). The heat producing fuel core is submerged within coolant water which continuously cycles through a reactor coolant circuit 14 for the purpose of carrying heat energy away from the fuel core in the form of pressurized hot water or steam to perform work.

Typically the heat energy transferring reactor coolant circuit 14 includes a steam conduit 16 for conveying steam generated from coolant water within the pressure vessel 12 to a steam driven turbine 18 which in turn rotates a generator 20 for producing electrical power. Spent steam and any condensation water therefrom is passed to steam condenser 22 to transform all water vapor to liquid, whereupon the condensation water is returned through return conduit 24 to the reactor pressure vessel 12, completing the cycle and for reuse as coolant water and moderator.

The coolant water/steam repeats this circuit substantially endlessly to continuously transfer heat energy from the fuel core to a means for converting it into work throughout a normal operating term.

There is an inevitable formation and accumulation of water born contaminants comprising corrosive agents and products, and fission produced and radioactive components, as well as other potentially detrimental ingredients throughout the coolant water and its circuit. This progressive concentration of contaminants within the coolant circuit system presents a potentially damaging condition with respect to equipment, especially valves and pumps, and/or can result in a build up of radioactive material which is hazardous to operating personnel.

In order to evaluate and deal with such accumulations of damaging water born containments it has become customary to routinely analyze the soluble contents of the coolant water from several different locations throughout the coolant circuit of a nuclear reactor plant. Coolant water testing means have evolved into the use of a common or consolidated water analyzing instrument provided with a network of sample drawing and conveying conduits or tubes for taking water specimen samples from multiple significant locations throughout the coolant water circulating system and transferring the specimens to the common instrument 26. For example, referring to FIG. 1 of the drawing, a series of conduits such as 28, 30, 32, 34 and 36, are provided for taking sample specimens of coolant water sequentially from a variety of different locations within the coolant water circuit and conveying the sampled water specimens to a common conduit 28 for sequential introduction into a single analytical water testing apparatus 26 for their respective evaluations.

Such a water testing arrangement provides for sequential taking of sample water specimens at different locations, and conveying streams of these sampled water specimens to and sequentially through the analytical water testing instrument for evaluation of predetermined likely solute ingredients carried in the reactor coolant water.

In the employment of nuclear reactor coolant water testing means such as described above, it had been found that the pH levels of high purity sample specimen streams affects equilibriums established between the sample carrying conduit walls and solute ions, such as copper and zinc, contained in the flowing water or liquid solvent phase. Specifically as the pH of the conveyed water drops, namely becomes more acid, the ions affected are released from the metal conduits. Conversely, as the pH of the conveyed water increases, namely becomes more basic, the affected ions deposit-/absorb/adsorb on the exposed surfaces of metal conduits. This pH induced condition has been determined to cause erroneous transients in on-line chemistry instrumentation, or when using grab sampling techniques. This shortcoming can be significant when undertaking to monitor multiple sample streams conveyed through a common conduit when the pH values vary from sample specimen to sample specimen.

Analytical testing procedures are employed wherein samples of nuclear reactor coolant water are collected at different locations throughout the overall reactor coolant circuit and sequentially conveyed to an analytical testing instrument for evaluation. Examples of such procedures are given above and in the previously cited U.S. patent. An improvement in such procedures includes a preanalysis adjustment in the pH values of the sampled water specimens.

Specifically that improvement comprises a system and procedure for acidifying or lowering the pH level of a flowing sample specimen of nuclear reactor coolant water, or process stream thereof, while being carried within a conduit or tube from the sampling site to the analytical testing apparatus. The means comprise injecting an acidifying gas, such as carbon dioxide, or liquid acids, into the flowing stream of the sampled water specimen. Thus, as the applied acidifying gas dissolves within the coolant water specimen, the pH level of the water is lowered, thereby reducing deposition of cations on the walls of any downstream conduit, tubing or sample bottles. The pH level is controlled by the partial pressure of the acidic gas administered in the injected-/absorbed gas mixture. The pH range should be thus adjusted to about 3.5 to about 5.5, and preferable about 4 to about 5.

Acidic gases suitable for lowering the pH level of coolant water specimens include carbon dioxide, hydrogen sulfide, chlorine, etc. An effective acidifying gas is one that will not contaminate the coolant water sample specimen with additional ions of those that are being monitored by the test. Carbon dioxide gas ($CO_2$) is ideal in meeting all such requirements, and is preferred. Carbon dioxide is readily soluble in water, forming a bicarbonate-carbonic acid equilibrium which effectively lowers the pH level of the water. The following equation illustrates this equilibrium reaction:

$$2H_2O + CO_2 \rightleftharpoons H_2O + H_2CO_3 \rightleftharpoons H_3O^+ + HCO_3^-$$

Laboratory evaluations of this procedure for effective pH adjustment have demonstrated that the memory effect for metal ions such as copper, can be reduced to negligible levels within a specimen of coolant water passing through either stainless steel or teflon tubing by means of injecting carbon dioxide gas directly into the specimen. Other acidifying gases, such as $H_2S$, $Cl_2$, $HNO_3$, etc., or aqueous solutions thereof, have shown similar effects in reducing ion memory.

Another problem common to water cooled nuclear reactors such as referred to hereinbefore, is that the cooling water contains and accumulates insoluble corrosion products and crud which includes radioactive material as well as other potentially detrimental insoluble material. Typically all such insolubles have been removed with mechanical filter means. However, such an arrangement entails inherent disadvantages including the accretion of hazardous insoluble material on filter means and the periodic need for removal as the filter flow becomes impeded or blocked. The cleaning or removing of such accumulated caustic and/or radioactive insoluble materials from filters presents a potential hazard to service personnel.

Moreover, it is customary to employ filtering means upstream of analytical instruments for the coolant water and their partial clogging can affect the analysis accuracy.

Figure 2:
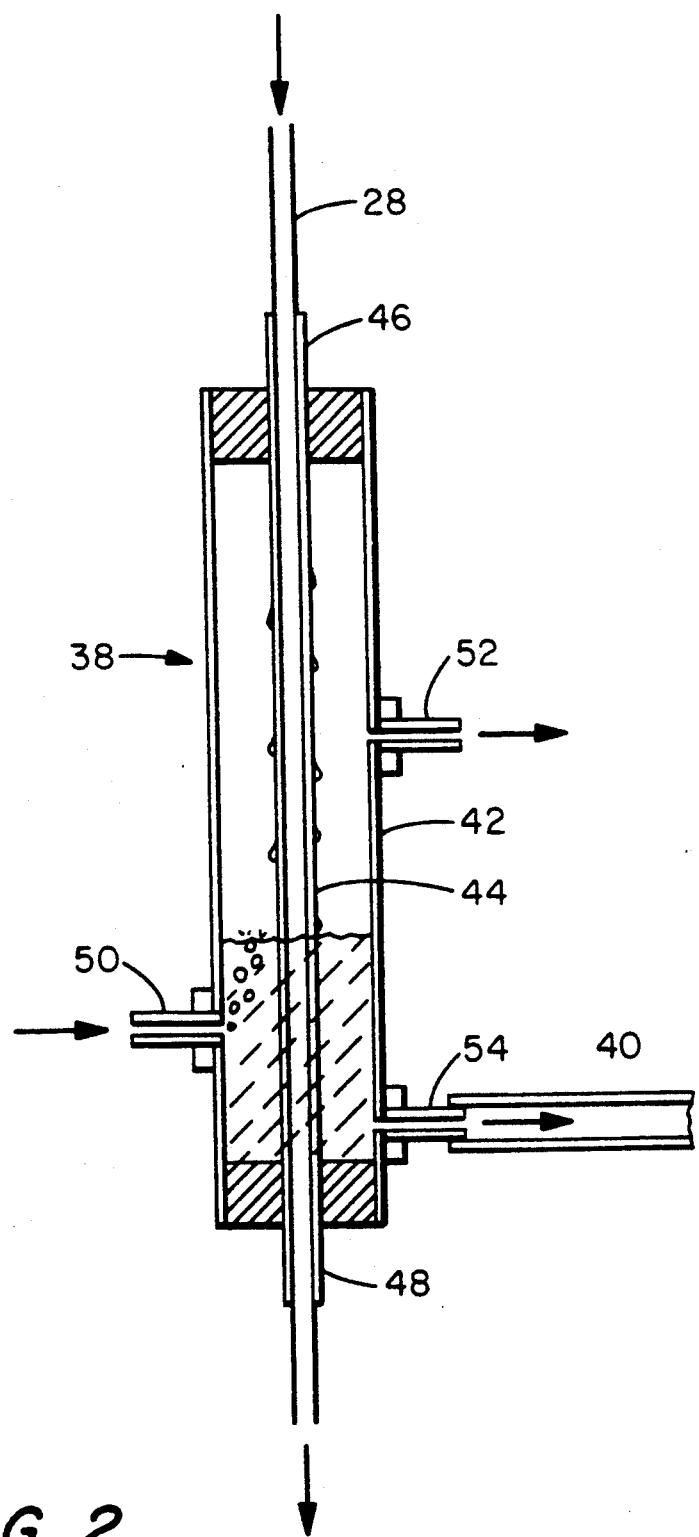
FIG. 2 of the drawings comprises a cross sectional view of one type of apparatus for carrying out the improvement of this invention.

FIG. 2 of the drawing illustrates a schematic plan for a self-cleaning filtration and pH reducing device 38 in accordance with this invention. As shown in the drawing, coolant water sample specimens pass from the nuclear reactor coolant circuit 14 or from the reactor vessel 12 through a conduit such as 30 or 32 or 34 to conduit 28 entering the preconditioning, filtration and pH adjusting device 38. A suitable acidifying gas such as carbon dioxide is thus injected into the coolant water specimen flowing through device 38 thereby lowering the pH level of the water test specimen. The preconditioned specimen flows from the device 38 through conduit 40 into the analytical water testing apparatus 26 for routine determination of certain ions pursuant to convention analytical practices.

The device 38 comprises a composite filtration and pH adjusting means generally consisting of an elongated filter housing 42 having a hollow filter medium 44 extending through the length thereof. The hollow filter medium is typically tubular in cross-section, and can be series pleated or convolutely folded longitudinally along its length to enlarge its filtering surface. The filter medium is provided with an upstream inlet 46 in fluid communication with conduit 28 for receiving sample coolant water into the hollow filter medium 44, and a downstream outlet 48 for discharging excess sample coolant water from within the hollow filter medium 44. The elongated filter housing 42 is provided with a downstream lateral inlet 50 into the filter housing 42 external of the hollow filter medium 44 which is connected to a source of an acidifying gas (not shown), such as carbon dioxide gas, for supplying the gas into the filter housing. An upstream discharge exit 52 is provided in the filter housing 42 for disposing of excess acidifying gas and sampled coolant water from an upper area of the filter housing 42 external of the filter medium 44. A discharge outlet 54 located in a lower portion of the filter housing 42 is connected in fluid communication through conduit 40 with the analytical water testing apparatus 26 for supplying specimens of filtered and pH adjusted coolant water samples for analytical testing.

In operation, the composite filtration and pH adjusting device 38 self-cleans the filter medium while filtering and acidifying sampled test specimens of nuclear reactor coolant water preparatory for analytical testing, as follows. Raw specimens of sampled coolant water drawn from the reactor vessel 12 or the reactor coolant circuit 14 enters the upstream inlet 46 of device 38 and flows into the interior of the hollow filter medium 44 where a portion of the specimens passes outward through the filter medium into the filter housing 42 while being released of any carried insoluble particulates which are retained on the inner surfaces of the hollow filter 44. Another portion of the sampled coolant water specimen continues through the length of the interior of the hollow filter medium 44, thereby sweeping the accumulation of retained insoluble particles from the inner surface of the hollow filter medium 44, and is discharged therefrom through downstream outlet 48 carrying the insolubles particles swept from the inner surface of the hollow filter.

Simultaneously with this filtering and self-cleansing of the filter surface, a suitable acidifying gas, such as carbon dioxide, is fed into the filter housing 42 external to the hollow filter medium 44 through a downstream inlet 50 located near lower portion of the filter housing 42 whereby the acidifying gas makes extensive contact with the portion of filtered coolant water in housing 42 by bubbling up therethrough. Thus the filtered portion of the sampled coolant water specimen is acidified reducing its pH whereby it is suitable for accurate analysis. This pH adjusted filtrate portion of the coolant water specimen is discharged from a lower portion of the filter housing 42 through outlet 54 which is connected in fluid communication with the analytical testing apparatus 26 through conduit 40 for supplying the pretreated water specimen thereto. Any excess filtrate and undissolved acidifying gas accumulating within the filter housing 42 is disposed of from the housing by means of discharge exit 52 located in an upper portion of the filter housing 42.

The filter medium 42 of the hollow filter can be constructed of any suitably effective filter compositions, such as fibrous materials or membranes of apt microfiltration capacity such as removing substantially all particulate matter down to about 0.1 microns.

This device providing on-line tangential flow microfiltration and pH adjustment achieves low maintenance, non-contaminating filtration of coolant water sample streams and injectection of an acidifying gas into the filtrate. Additionally the device provides self-cleaning insoluble particulate removal down to less than 0.1 microns by means of a high flowrate water stream scrubbing away deposited insoluble particulates from the interior surface of the hollow filter media. A small portion of the coolant water flow passes through the filter medium wall becoming clarified filtrate.

The pH reduction adjustment of this system is controlled by the partial pressure of the acidic gas in the injected/absorbed gas mixture. Excess gas is removed by venting from the device out through discharge exit 52.

The device 38 can accommodate one or multiple samples conduits or tubes, such as conduit 28, or other water coolant carrying streams.

The apparatus for filtering and adjusting the pH of a gaseous sample streams of reactor coolant water for preparing analytical test specimens of this invention accordingly is self-cleaning, reduces any insoluble particulate contents to less than about 0.1 microns with minimal specimen contamination while reducing the pH of the sampled stream to enhance accuracy and precision improvement of the analytical monitoring instrumentation.

This invention provides an uncomplicated and reliable means for filtering while achieving pH level reductions on-line with minimal contaminations of a sample specimen. This means at best eliminates or at least reduces the ion memory effect of sample specimens. Moreover, the invention controls the pH of a coolant water stream independent of flowrate, and improves the accuracy and precision for on-line sample specimen monitoring instrumentation. The preferred acidifying gas carbon dioxide is non-toxic, acidic or basic and requires minimum precautions for safe handling, and the pH reduction achieved with this gas is limited by the solubility of carbon dioxide in water and the partial pressure of carbon dioxide in the acidifying gas thereby providing an easily controllable procedure.

Figure 3:
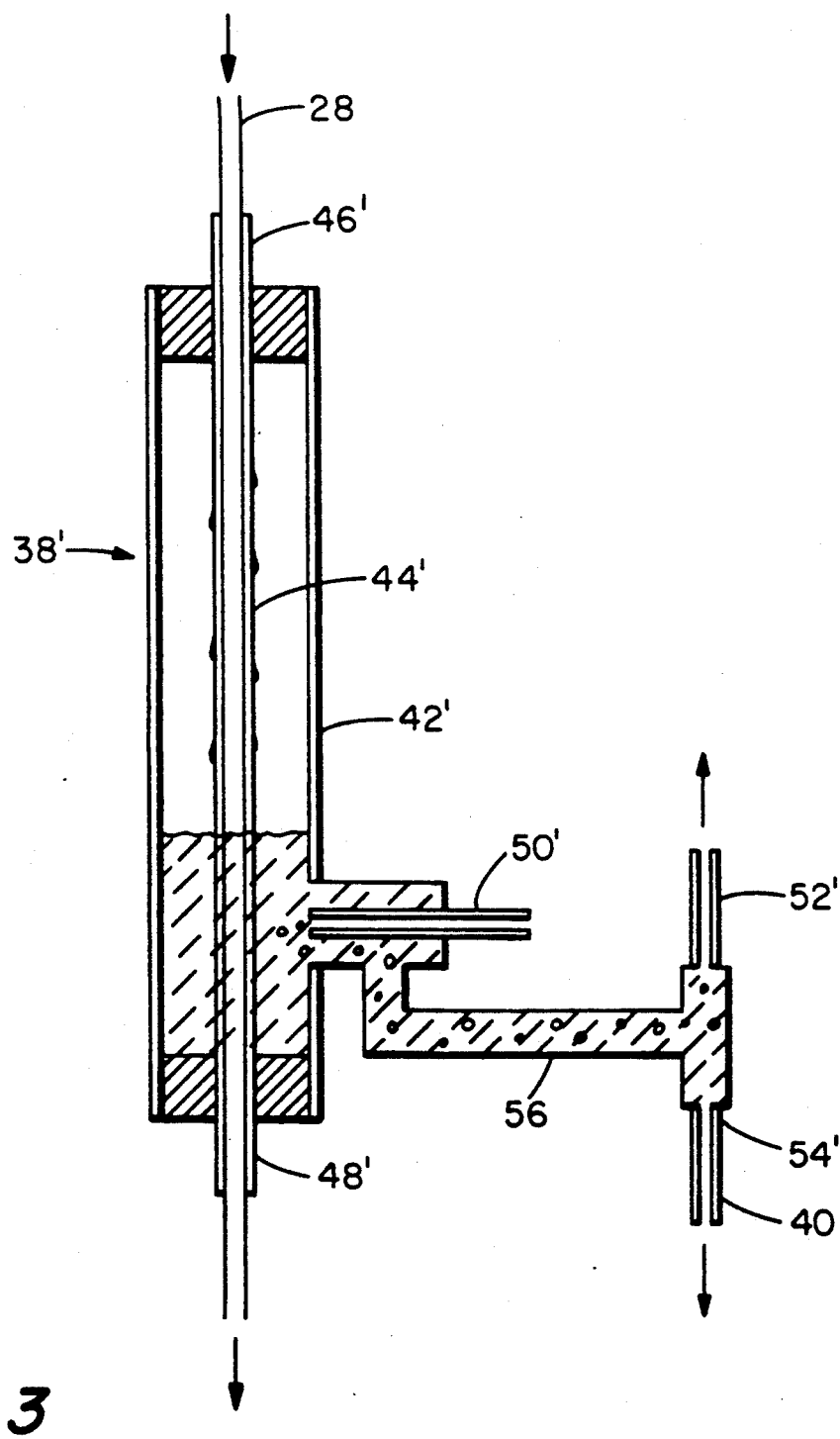
FIG. 3 of the drawings comprise another cross sectional view of a variation of an apparatus for carrying out the improvement of this invention.

FIG. 3 of the drawings illustrates another embodiment or variation of the pH adjusting and filtering apparatus 38' of this invention. Similar to the embodiment of FIG. 2, this version of the device 38' generally consists of an elongated filter housing 42' having a hollow filter medium 44' extending the length thereof. The hollow filter medium 44' is provided with an upstream inlet 46' in fluid communication with conduit 28 for receiving sampled coolant water into the hollow filter medium 44', and a downstream outlet 48' for discharging excess sample coolant water from within the hollow filter medium 44'. The elongated filter housing 42' is provided with a generally lateral, elongated tubular branch section 56 that adjoins the lower portion of the housing 42' in fluid communication and a generally 90° direction. Branch section 56 is provided with an inlet 50' located in close proximity to the housing 42', and is connected to a source of an acidifying gas (not shown), such as carbon dioxide gas, for supplying gas through the branch section 56 into the housing 42' for acidifying the filtered water flowing from the filter 44' through the branch section 56. A discharge exit 52' extends generally upward from adjacent the end of branch section 56 opposite the end adjoining the housing 42', for disposing of any excess acidifying gas and sampled coolant water. A discharge outlet 54' extends outward from adjacent the end of branch section 56 opposite the end adjoining the housing 42', which connects with conduit 40 and thus is in fluid communication with the analytical water testing apparatus 26 to supply specimens of filtered and pH adjusted coolant water samples for analytical testing. It can be readily seen that this embodiment of FIG. 3 functions substantially similar to the embodiment of FIG. 2 insofar as the filtering functions and application of an acidifying gas.

What is claimed is:

1. An apparatus for filtering and adjusting the pH of aqueous sample streams comprising the combination of a water cooled, heat producing nuclear reactor and an analytical testing device for evaluating soluble contents in the reactor coolant water, said nuclear reactor comprising a reactor vessel with a coolant water circulating system having at least one sampling water specimen conduit providing fluid communication between the reactor vessel coolant water circulating system and the analytical testing device for supplying test specimens of reactor coolant water to the testing device, a composite self-cleaning filtration and pH adjusting means for treating the sampled water specimens operatively located in the sampling water specimen conduit upstream from the analytical testing device, said filtration and pH adjusting device comprising an elongated housing having a hollow filter medium passing therethrough with an upstream external inlet into the hollow filter medium connected with the sampling water specimen conduit for feeding a flow of a sampled water specimen and a downstream external outlet from the hollow filter medium for discharging any excess of a water specimen, a downstream entry into the filter housing for supplying an acidifying gas into the filter housing external to the hollow filter medium for acidifying sampled water specimens introduced into the housing, a discharge outlet for the outflow of acidified and filtered sampled water specimen connected to the analytical testing device, and a discharge exit for disposing of excess acidifying gas and water specimen.

2. The apparatus for filtering and adjusting the pH of aqueous sample streams of claim 1, wherein the hollow filter medium comprises a fiber filter.

3. The apparatus for filtering and adjusting the pH of aqueous sample streams of claim 1, where the hollow filter medium comprises a porous membrane filter.

4. The apparatus for filtering and adjusting the pH of aqueous sample streams of claim 1, wherein the downstream entry into the filter housing for supplying an acidifying ga into the filter housing is connected to a source of carbon dioxide gas.

5. An apparatus for filtering and adjusting the pH of aqueous sample streams comprising the combination of a water cooled, heat producing nuclear reactor and an analytical testing device for evaluating soluble contents in the reactor coolant water, said nuclear reactor comprising a coolant water containing reactor vessel with a coolant water circulating system having at least one sampling water specimen conduit providing fluid communication between the coolant water circulating system of the reactor vessel and the analytical testing device for supplying coolant water test specimens from the reactor vessel circulating system to the analytical testing device, a composite self-cleaning filtration and pH adjusting means for treating the sampled water specimens operatively located in the sampling water specimen conduit upstream from the analytical testing device, said filtration and pH adjusting device comprising an elongated cylindrical housing having a hollow tubular filter medium passing therethrough with an upstream external inlet into the tubular filter medium connected with the sampling water specimen conduit for feeding a flow of a sampled water specimen into the tubular filter and a downstream external outlet from within the tubular filter for discharging any excess of a water specimen, a downstream entry into the filter housing for supplying acidifying carbon dioxide into the filter housing external to the tubular filter medium for acidifying sampled water specimens introduced into the filter housing, a discharge outlet for the outflow of acidified and filtered sampled water specimen connected to the analytical testing device, and a discharge exit for disposing of excess acidifying gas and water specimen.

6. The apparatus for filtering and adjusting the pH of aqueous sample streams of claim 5, wherein the tubular filter medium comprises a fiber filter medium.

7. The apparatus for filtering and adjusting the pH of aqueous sample streams of claim 5, wherein the tubular filter medium comprises a porous membrane filter.

8. The apparatus for filtering and adjusting the pH of aqueous sample streams of claim 5, wherein the downstream entry into the filter housing for supplying carbon dioxide acidifying gas into the filter housing is connected to a source of carbon dioxide gas.

9. The apparatus for filtering and adjusting the pH of aqueous sample streams of claim 5, wherein the reactor vessel is provided with multiple sampling water specimen conduits at different locations about the reactor vessel which converge and join into the upstream external inlet into the tubular hollow filtration medium of the composite self-cleaning filtration and pH adjusting means for analyzing water specimens sampled from different locations about the reactor vessel.

10. An apparatus for filtering and adjusting the pH of aqueous sample streams comprising the combination of a water cooled, heat producing nuclear reactor and an analytical testing device for evaluating the soluble contents in the reactor coolant water, said nuclear reactor comprising a coolant water containing reactor vessel with a coolant water circulating system having a plurality of sampling water specimen conduits providing fluid communication between several locations in the coolant water circulating system of the reactor vessel and the analytical testing device for supplying coolant water test specimens from different locations in the reactor vessel circulating system to the analytical testing device, a composite self-cleaning filtration and pH adjusting means for treating the sampled water specimens operatively located in fluid communication with the sampling water specimen conduits upstream from the analytical testing device, said filtration and pH adjusting device comprising an elongated cylindrical housing enclosing a hollow tubular filter medium passing therethrough with an upstream external inlet into the hollow tubular filter medium connected with the sampling water specimen conduits for feeding a flow of a sampled water specimen into the hollow tubular filter medium and a downstream external outlet from within the hollow tubular filter medium for discharging any excess of a water specimen, a downstream entry into the filter housing for supplying acidifying carbon dioxide gas into the filter housing external to the hollow tubular filter medium for acidifying sampled water specimens introduced into the filter housing, a discharge outlet for the outflow of acidified and filtered sampled water specimen connected to the analytical testing device, and a discharge exit for disposing of excess acidifying carbon dioxide gas and sampled water specimen in an upstream portion of the filter housing.

11. An apparatus for filtering and adjusting the pH of aqueous sample streams comprising the combination of a water cooled, heat producing nuclear reactor and an analytical testing device for evaluating soluble contents in the reactor coolant water, said nuclear reactor comprising a reactor vessel with a coolant water circulating system having at least one sampling water specimen conduit providing fluid communication between the reactor vessel coolant water circulating system and the analytical testing device for supplying test specimens of reactor coolant water to the testing device, a composite self-cleaning filtration and pH adjusting means for treating the sampled water specimens operatively located in the sampling water specimen conduit upstream from the analytical testing device, said filtration and pH adjusting device comprising an elongated housing having a hollow filter medium passing therethrough with an upstream external inlet into the hollow filter medium connected with the sampling water specimen conduit for feeding a flow of a sampled water specimen and a downstream external outlet from the hollow filter medium for discharging any excess of a water specimen, said elongated housing having a lateral branch section extending in fluid communication outward from a lower portion of the housing, an entry into the branch section adjacent to the housing for supplying an acidifying gas into the branch section for acidifying sampled water specimens introduced into the housing and flowing into the branch section, a discharge outlet in an outer end of the branch section for the outflow of acidified and filtered sampled water specimen connected to the analytical testing device, and a discharge exit for disposing of excess acidifying gas and water specimen in the outer end of the branch section.

12. The apparatus for filtering and adjusting the pH of aqueous sample streams of claim 11, wherein the hollow filter medium comprises a fiber filter.

13. The apparatus for filtering and adjusting the pH of aqueous sample streams of claim 11, where the hollow filter medium comprises porous a membrane filter.

14. The apparatus for filtering and adjusting the pH of aqueous sample streams of claim 11, wherein the entry into the branch section for supplying an acidifying gas into the filter housing is connected to a source of carbon dioxide gas.

15. An apparatus for filtering and adjusting the pH of aqueous sample streams comprising the combination of a water cooled, heat producing nuclear reactor and an analytical testing device for evaluating the soluble contents in the reactor coolant water, said nuclear reactor comprising a coolant water containing reactor vessel with a coolant water circulating system having a plurality of sampling water specimen conduits providing fluid communication between several locations in the coolant water circulating system of the reactor vessel and the analytical testing device for supplying coolant water test specimens from different locations in the reactor vessel circulating system to the analytical testing device, a composite self-cleaning filtration and pH adjusting means for treating the sampled water specimens operatively located in fluid communication with the sampling water specimen conduits upstream from the analytical testing device, said filtration and pH adjusting device comprising an elongated cylindrical housing enclosing a hollow tubular filter medium passing therethrough with an upstream external inlet into the hollow tubular filter medium connected with the sampling water specimen conduits for feeding a flow of a sampled water specimen into the hollow tubular filter medium and a downstream external outlet from within the hollow tubular filter medium for discharging any excess of a water specimen, said elongated housing having a laterally extending branch section projecting outward from a lower portion of the housing and in fluid communication therewith, an entry into the branch section adjacent to the housing for supplying acidifying carbon dioxide gas into the branch section for acidifying sampled water specimens introduced into the filter housing and in turn the branch section, a discharge outlet for the outflow of acidified and filtered sampled water specimen connected to the analytical testing device, and a discharge exit in an outer end of the branch section for disposing of excess acidifying carbon dioxide gas and sampled water specimen.

* * * * *